(12) United States Patent
Caterino et al.

(10) Patent No.: US 11,313,665 B2
(45) Date of Patent: Apr. 26, 2022

(54) DEADBOLT POSITION SENSOR

(71) Applicant: ASSA ABLOY Residential Group, Inc., New Haven, CT (US)

(72) Inventors: Mark Caterino, Prospect, CT (US); Wai P. Wong, Orange, CT (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 711 days.

(21) Appl. No.: 16/255,125

(22) Filed: Jan. 23, 2019

(65) Prior Publication Data

US 2019/0226827 A1    Jul. 25, 2019

Related U.S. Application Data

(60) Provisional application No. 62/621,448, filed on Jan. 24, 2018.

(51) Int. Cl.
*G01B 7/30* (2006.01)
*E05B 47/00* (2006.01)

(52) U.S. Cl.
CPC ............ *G01B 7/30* (2013.01); *E05B 47/0012* (2013.01); *E05B 2047/002* (2013.01); *E05B 2047/0069* (2013.01); *E05Y 2900/132* (2013.01)

(58) Field of Classification Search
None
See application file for complete search history.

(56) References Cited

U.S. PATENT DOCUMENTS 9,140,035 B2    9/2015  McKibben et al.
2013/0219975 A1*  8/2013  Ainley ............... G05B 19/0405
                                    70/279.1

* cited by examiner

*Primary Examiner* — Thomas S McCormack
(74) *Attorney, Agent, or Firm* — Wolf, Greenfield & Sacks, P.C.

(57) ABSTRACT

Embodiments described herein relate to a motorized door lock detection system. Some embodiments of the device include a sensor gear that meshes directly with the gear system of the motorized door lock. As the sensor gear rotates, it drives the rotating contact of a potentiometer, varying the voltage in a reference circuit that corresponds directly with an angular position of the thumb-drive used to drive the deadbolt. In some embodiments, a conducting member that rotates with the output shaft of the deadbolt contacts a plurality of electrical contacts positioned such that they are contacted when the deadbolt is in a position range that requires more precise position monitoring. When the conducting member is in contact with a deadbolt, power is supplied such the output from the potentiometer can be determined. In this way, power to the potentiometer and/or controller driving the potentiometer can be limited.

19 Claims, 8 Drawing Sheets

DEADBOLT POSITION SENSOR

RELATED APPLICATIONS

This Application claims the benefit under 35 U.S.C. § 119(e) to U.S. Provisional Application Ser. No. 62/621,448, filed Jan. 24, 2018, entitled "DEADBOLT POSITION SENSOR" which is herein incorporated by reference in its entirety.

FIELD

Embodiments disclosed herein relate to deadbolt position detection systems.

BACKGROUND

Traditionally, deadbolt locks are used to secure access points (e.g., doors) from unauthorized entry. These deadbolt locks are conventionally unlocked with a key or other valid credential, such that an authorized user can enter or exit through the access point. Conventional deadbolts of such locks extend into an associated jamb adjacent the access point. Some deadbolt locks may be electro-mechanically actuated.

SUMMARY

According to one aspect, a deadbolt sensing system for sensing a position of a deadbolt is provided. The sensing system includes a controller and an output shaft. The angular position of the output shaft corresponds to a position of the deadbolt. A conducting member is operatively coupled to the output shaft and constructed and arranged to move with the output shaft. At least one pair of conductive traces electrically is connectable with the conducting member at a plurality of angular positions of the output shaft as the output shaft rotates. The controller is configured to determine a position of the deadbolt based at least on a first contacting position of the conducting member with the at least one pair of conductive traces.

According to another aspect, a deadbolt sensing system for sensing a position of a deadbolt is provided. The sensing system includes a rotation sensor, a controller and an output shaft. An angular position of the output shaft corresponds to a position of the deadbolt. The rotation sensor monitors the angular position of the output shaft. A conducting member is operatively coupled to the output shaft and constructed and arranged to move with the output shaft. At least one pair of conductive traces is electrically connectable with the conducting member at a first plurality of angular positions of the output shaft as the output shaft rotates. The connecting of the at least one pair of conductive traces and conducting member triggers the controller to read the angular position of the output shaft from the rotation sensor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
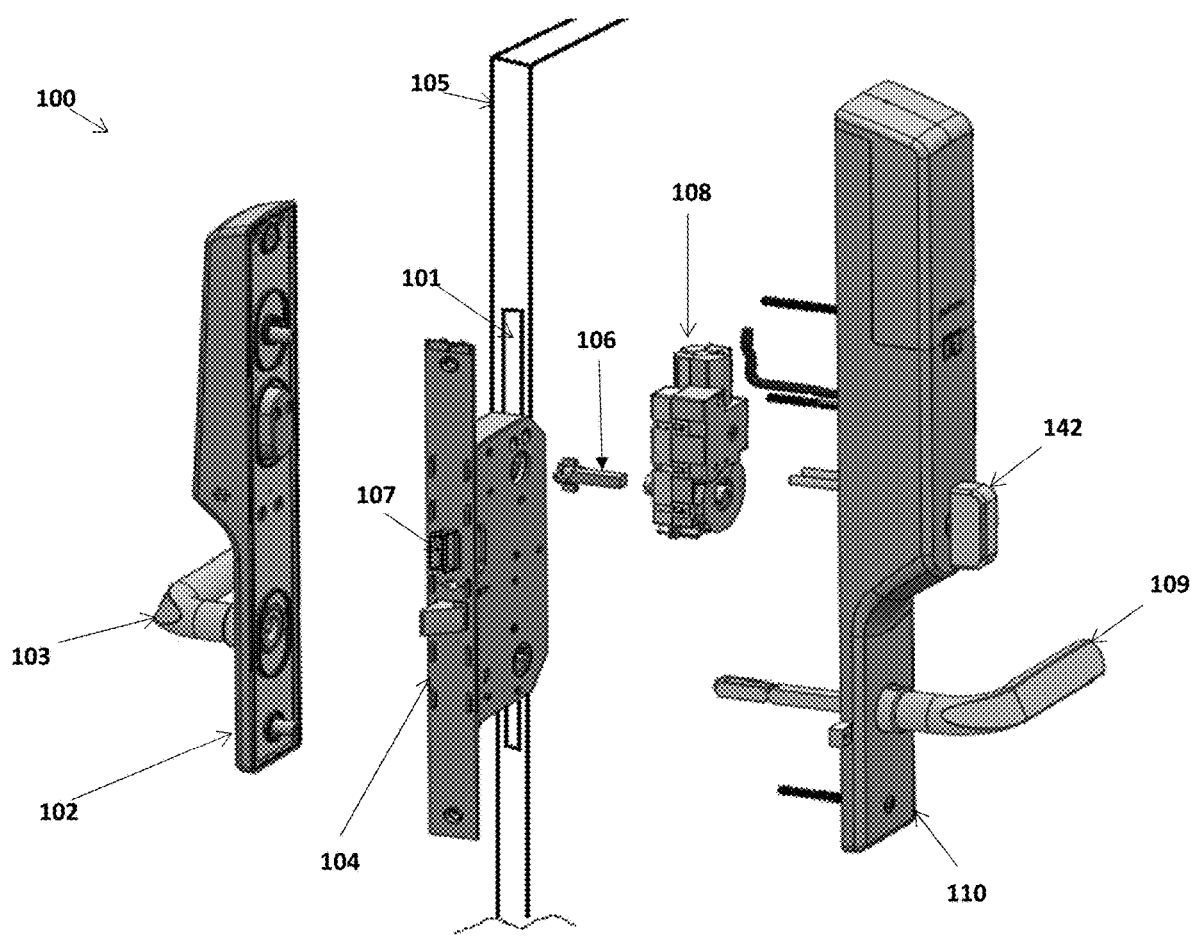
FIG. 1 is an exploded perspective view of a lock assembly including a gearbox assembly according to one embodiment.

It should be understood that aspects are described herein with reference to certain illustrative embodiments and the figures. The illustrative embodiments described herein are not necessarily intended to show all aspects, but rather are used to describe a few illustrative embodiments. Thus, aspects are not intended to be construed narrowly in view of the illustrative embodiments. In addition, it should be understood that certain features disclosed herein might be used alone or in any suitable combination with other features.

A deadbolt lock is a common locking arrangement used to secure doors. As is well known in the art, deadbolt locks are mounted to doors and include a deadbolt that, in the open/retracted position, sits at least partially within the lock housing, and in the locked position/extended position, extends out from its housing into a complementary recess within an associated doorjamb, thereby preventing the opening of the door. Deadbolt locks have traditionally been manually operable by operating a thumb drive and/or a physical key. It is becoming increasingly common to have a deadbolt system operable via an electromechanical actuation system to allow a user to automatically operate the deadbolt. In addition, such electromechanical actuation systems may be remotely controlled via a wireless system.

In such electromechanically operated deadbolt systems, current mechanisms commonly involve an electric motor driving the movement of the deadbolt. Most small electric motors suitable for this application deliver high-speed rotational outputs that may not be conducive to moving a deadbolt into the extended or retracted positions. Thus, in one embodiment, an electromechanically driven deadbolt system utilizes a gear train to both translate motor rotational output to linear deadbolt motion, and reduce the delivered speed while increasing output force. The inventors have previously discovered that using a planetary gear system to drive the deadbolt is a particularly efficient way to translate motor output to linear movement of the deadbolt, as described in U.S. provisional patent applications 62/501,308 and 62/552,195, each of which is hereby incorporated by reference in their entireties.

Users of a remotely activatable deadbolt system may desire to circumvent the remote features and instead manually lock and unlock the deadbolt. The inventors have previously found that it would be beneficial to have a system that allows the user to manually actuate the deadbolt without also activating at least portions of the gear train to avoid back-driving the motor or requiring multiple revolutions of the thumb drive.

With electromechanically activatable deadlock systems that can also be manually actuated, it may be desirable to have accurate reporting of the location of the deadbolt for optimal motor operation. Additionally, with the inclusion of a physical thumb-turn, the deadbolt is not constrained to only predefined rotation caused by the motor, adding an additional layer of complexity to positional monitoring.

In one embodiment, the deadbolt lock includes an output shaft coupled to the deadbolt. Thus, whether driven via a gear system or via a manual thumb-turn, the deadbolt moves upon rotation of an output shaft. In one embodiment, the output shaft includes a gear such that the rotation of the shaft could drive the rotation of a reference gear engaged with the output shaft gear in a fixed 1:1 ratio relative to the output shaft such that an accurate report of the deadbolt position based on the reference gear's rotational state can be obtained. In some embodiments, the reference gear rotates about a reference shaft that in turn can be sensed by a potentiometer. By sensing the output of the potentiometer, an accurate position of the deadbolt may be obtained.

The inventors have further contemplated that constantly energizing a sensor (e.g., the potentiometer) and/or the associated processor to actively monitor the position of the deadbolt could be prohibitively energy intensive. In view of this, in some embodiments, power is only applied to the processor and potentiometer when the deadbolt is otherwise in a range of positions that would warrant accurate sensing. Such a range may be, for example, a range where the deadbolt is only partially extended.

In one embodiment, the output shaft that connects the thumb-turn and motor to the deadbolt further includes a conductive member such that the conductive member rotates with the output shaft. In one embodiment, the output shaft includes a flange to which the conductive member is attached. A sensor board including a plurality of arc shaped electrical contacts arranged in a circular configuration is juxtaposed the conductive member such that the contacts are coaxial with the circular path traced by the rotating conducting member. Each contact covers a range of angular positions of the conducting member corresponding to when the deadbolt is in one of the range of positions that requires particularly accurate sensing. In some embodiments, contact is made corresponding to a position of the deadbolt when it is sufficiently retracted for the door to be considered unlocked. In some embodiments, contact is made corresponding to a position of the deadbolt when it is sufficiently extended to indicate that the door is locked. In some embodiments, contact is made at both ranges of positions. Other embodiments could have different positional ranges.

As the output shaft rotates, when the deadbolt enters a region that warrants accurate position sensing, the conducting member touches the corresponding contact, establishing an electrical connection. This connection triggers potentiometer to sense the position and/or the processor to monitor the voltage in the potentiometer circuit, providing an exact angular position and equivalent deadbolt position.

In one embodiment, the deadbolt position sensor is ambidextrous. That is, in one embodiment, the sensor board is configured with a right-hand contact corresponding to when the deadbolt is sufficiently extended via clock-wise rotation of the thumb-turn or "right hand locked" (which may be used in a situation where the deadbolt lock is positioned on the left hand side of the door), and the sensor board is configured with a left-hand contact corresponding to when the deadbolt is sufficiently extended via counter clock-wise rotation of the thumb-turn or "left hand locked" (which may be used in a situation where the deadbolt lock is positioned on the right hand side of the door).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts an exploded view of an embodiment of a lock system including an embodiment of the gearbox having a gear system. Lock system 100 can be set into a compatible door 105 to provide locking capabilities to the door. Front escutcheon plate 102 protrudes from the door facing the "outside", and has outer lever handle 103 connected to a mortise lockset 104, which is set into the door in recess 101. Pulling down on the outer lever handle retracts the spring latch integral to the mortise lockset, thus allowing entrance through the door when the door is not locked. On the other side of mortise lockset 104 is main escutcheon 110, which protrudes from the door, facing the "inside". On main escutcheon 110 is inner lever handle 109, which functions similarly to outer lever handle 103, and drive bar 142. At least partially within main escutcheon 110 rests gearbox assembly 500. Actuator 106 protrudes from gearbox assembly 500 and into mortise lockset and its rotation cams the deadbolt 107 into or out of the doorframe (not shown). In FIG. 1, deadbolt 107 is shown in the extended position. It should be noted that though the figures depict each piece in a certain shape, the embodiments are not limited to the shape and arrangements depicted. Other rotating arrangements including knobs, rods, or any possible means for a user to produce rotation motion are contemplated for operation of the mortise lockset 104. Furthermore, other locksets in place of the mortise lockset are also contemplated.

Figure 1A:
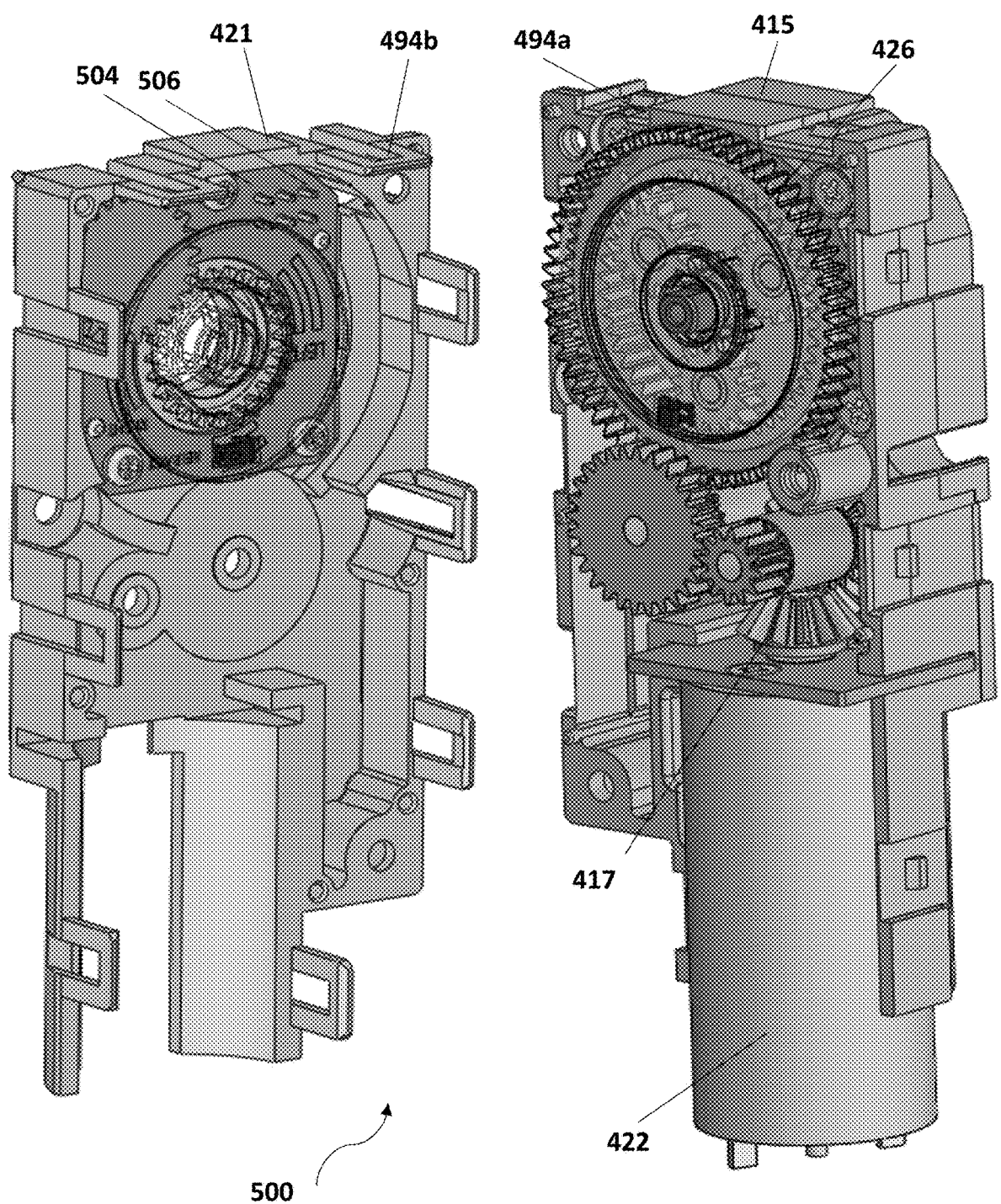
FIG. 1A is a perspective view of the upper and lower housings of the gearbox assembly of FIG. 1 including the deadbolt position sensing system according to one embodiment.
Figure 2:
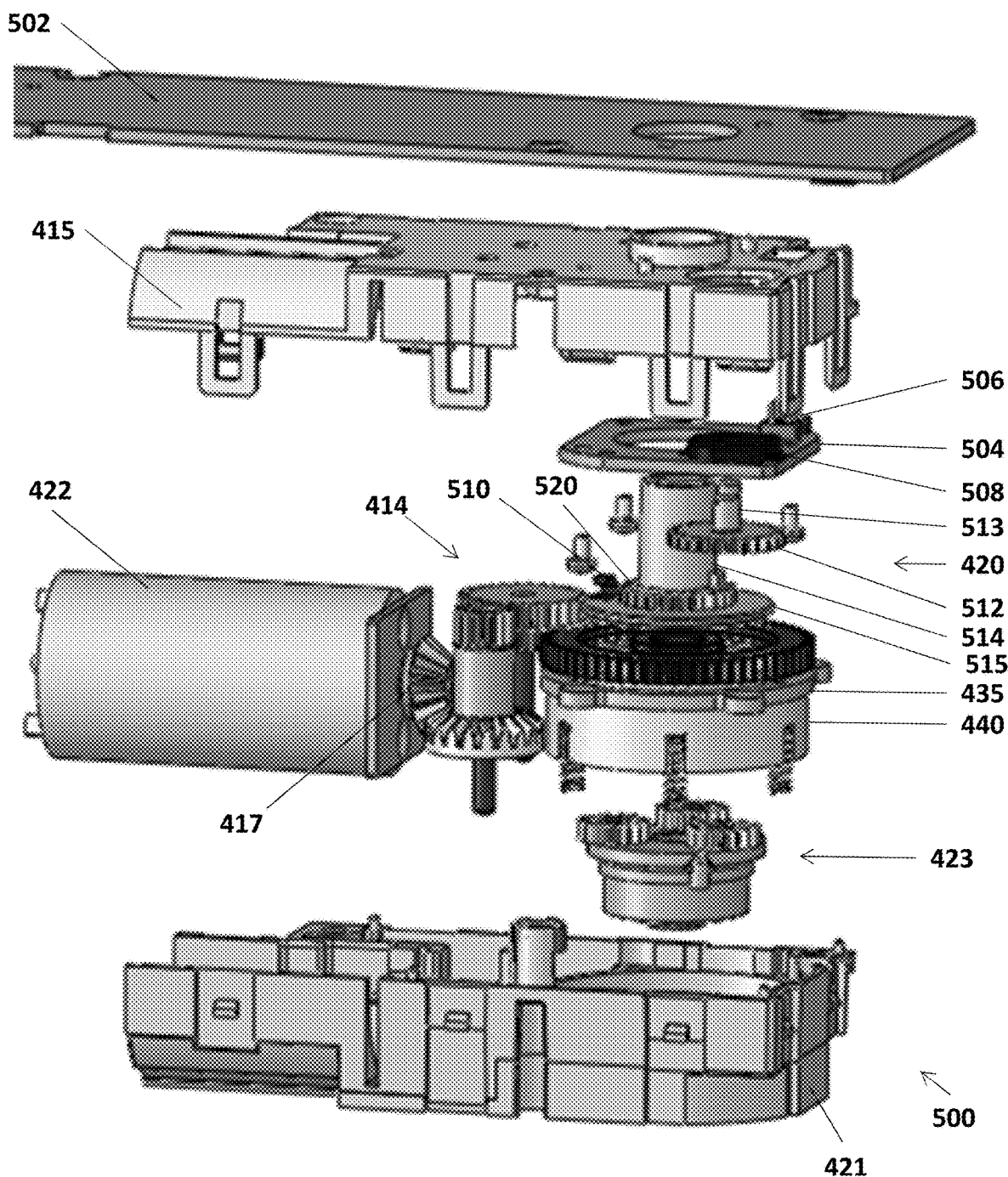
FIG. 2 is an exploded perspective view of the gearbox assembly according to one embodiment.
Figure 5:
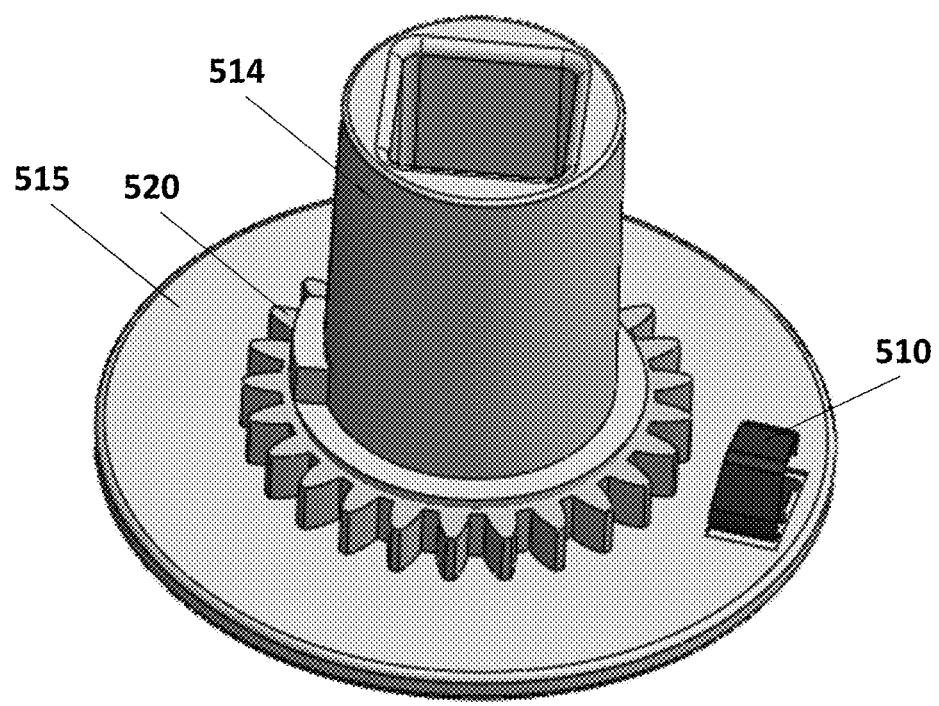
FIG. 5 is a perspective view of an output shaft and associated gear of the deadbolt position sensing system according to one embodiment.

FIG. 1A is a perspective view of the upper and lower housings 415 and 421 respectively of the gearbox assembly 500 including the deadbolt sensing system according to one embodiment. FIG. 2 shows an exploded view of the gearbox assembly 500 including the deadbolt sensing system. A circuit board 502 having various control circuitry mounted therein is shown as lying above the gearbox and is part of the lock system. The gear train within the gearbox assembly may be driven by a motor 422, which rotates beveled pinion gear 417, driving gear train 414, which in turn drives gear system 420 to actuate the deadbolt. A clutch assembly 423 may be employed in some embodiments and connects the gear system to the output shaft 514 when the motor 422 is used to drive the deadbolt, and disconnects the gear system from the output shaft when the thumb-drive 142 (not shown in FIG. 2) is used to directly drive the deadbolt. As best shown in FIG. 5, output shaft 514 includes a flange 515, with a conductive member or wiper 510 extending from it. In one embodiment, the conductive member is made of copper and is formed as a leaf spring biased to engage conductive traces, as will become apparent. In one embodiment, the output shaft with its flange and gear is formed as a single monolithic component which may be formed of a non-conductive material such as plastic. The conductive wiper is affixed to the flange 515. A sensor board 504 is positioned juxtaposed to the conductive member such that as the output shaft rotates, conducting member 510 also rotates to form an electrical connection with conductive traces on the sensor board 504. The wiper 501, being mounted to the shaft (and more specifically to the flange of the output shaft), is synchronized with the movement of the shaft rotation. As the wiper enters one region of conductive traces, the wiper 510 electrically connects the two conductive traces. In one embodiment, contacting the conductive traces with the wiper completes an otherwise open electrical path. In another embodiment, one conductive trace is connected to ground and the other to a higher voltage. Thus, when the conductive member 510 connects the two traces together, the controller can determine the location of the shaft as being either in the "retracted" or "extended" state. Such an arrangement provides an approximate location of the deadbolt position. Further, without wishing to be bound by theory, any lost motion in the system will affect the accuracy of the deadbolt location. In this embodiment, the conducting member 510 and arcuate pairs provides only end-point position and not full range position monitoring.

In one embodiment, the sensor board 504 also includes a potentiometer 508 mounted thereto as well as a plug 506 that plugs into a power and/or data jack through a window in upper housing 415 to form an electrical and/or data connection with the circuit board 502. The output shaft further includes a gear 520 disposed that meshes with a reference gear 512. A reference shaft 513 of reference gear 512 rotates with the reference gear. Thus, as the output shaft rotates, the gear 520 rotates therewith and being meshed with the reference gear, rotates the reference gear. The rotating reference gear thus rotates reference shaft 513. The potentiometer 508 is able to more precisely sense the rotation of the shaft 513 as it rotates and thus provide more precise position information of the deadbolt.

Figure 3B:
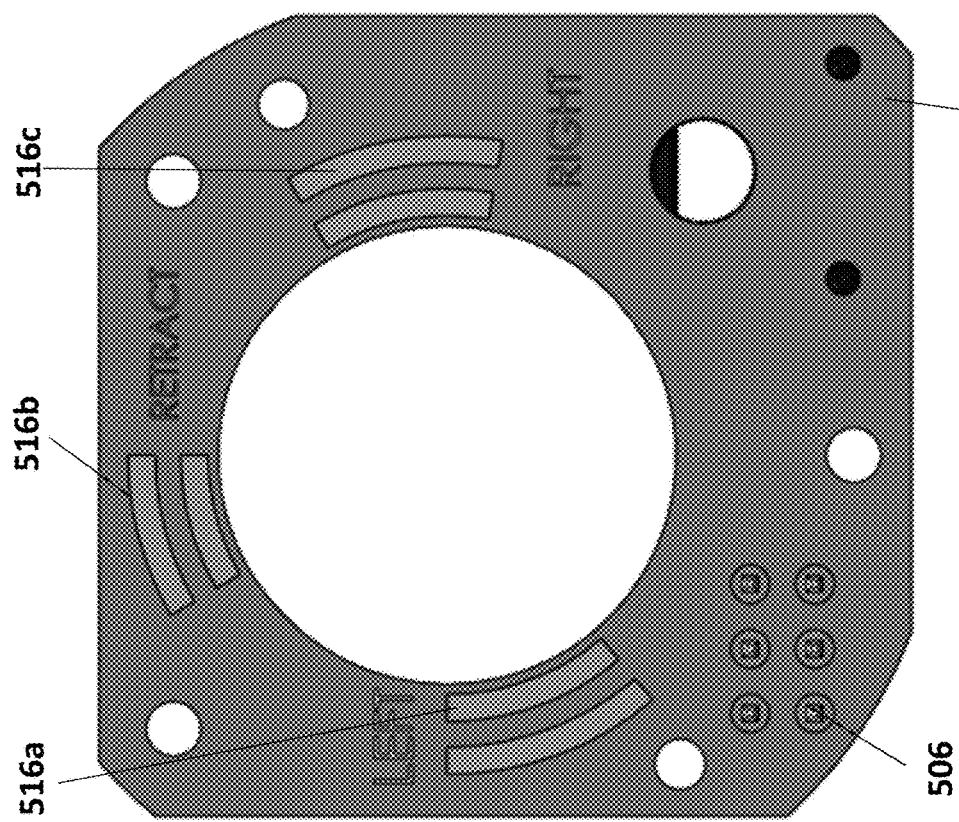
FIG. 3B is a bottom view of the sensor board of the deadbolt position sensing system according to the embodiment of FIG. 3A.
Figure 3A:
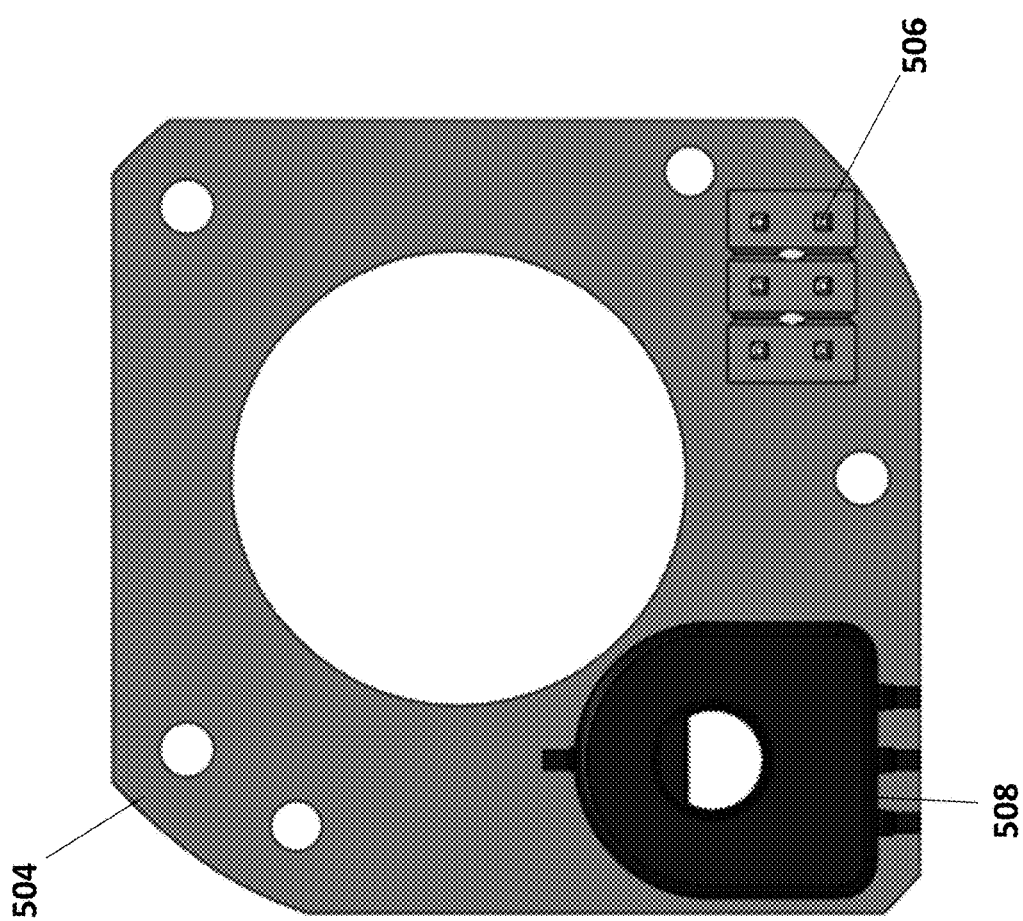
FIG. 3A is a top view of a sensor board of the deadbolt position sensing system according to one embodiment.
Figure 4A:
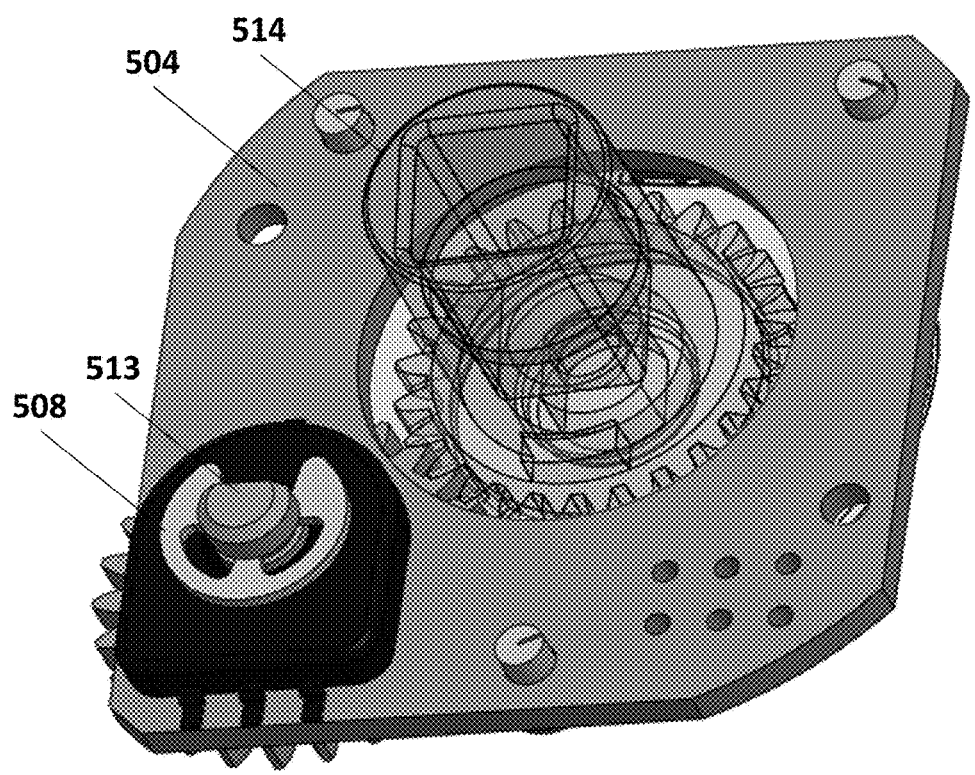
FIG. 4A is a top perspective view of a portion of the deadbolt position sensing system according to one embodiment.
Figure 4B:
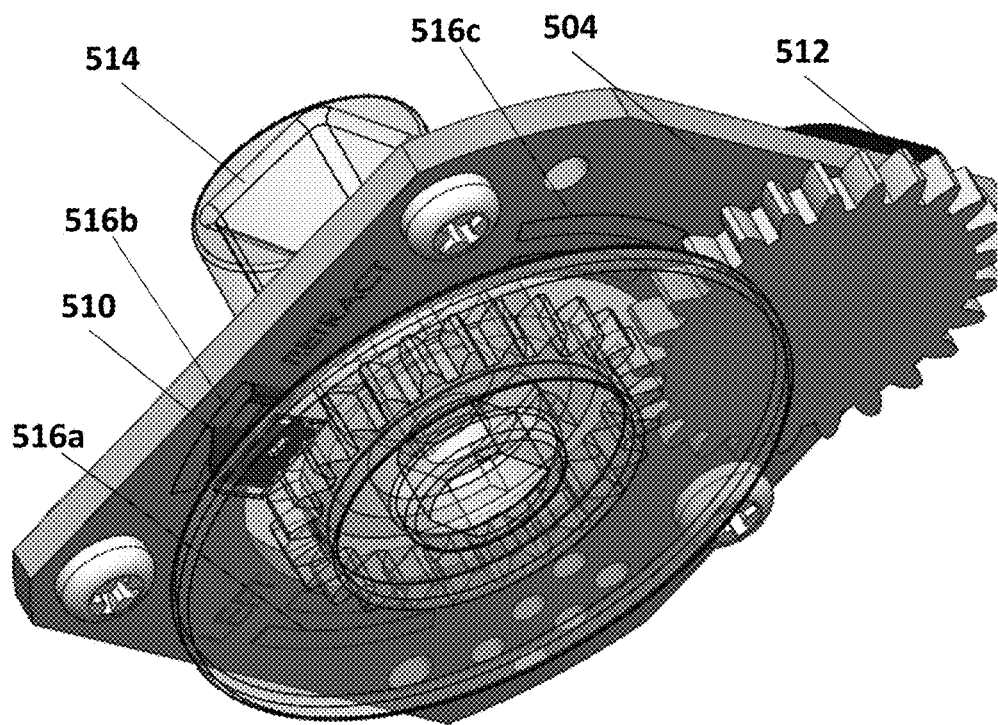
FIG. 4B is a bottom perspective view of the portion of the deadbolt position sensing system according to the embodiment of FIG. 4A.

FIGS. 3A and 3B shows the opposites sides of the sensor board 504 according to one embodiment. FIGS. 4A and 4B show the sensor board 504 along with the output shaft 514 with gear 520, contact 510, reference gear 512 and potentiometer 508. FIG. 5 is an enlarged view of the output shaft (with its square-shaped slot that interacts with the thumb-drive 142) having gear 520 mounted thereto, flange 515 extending therefrom and conducting member 510 mounted to the flange 515. Continuing with reference to FIGS. 3A, 3B, 4A and 4B, in this embodiment, conducting member 510 establishes an electrical connection when it touches contact pairs 516a, 516b, and 516c, respectively, by electrically connecting the contact pairs. When the contact pairs are electrically connected via the conducting member 510 (as the conducting member bridges the pairs), an electrical circuit is completed and the potentiometer 508 is powered. In this embodiment, as noted above, the sensing system is ambidextrous. Accordingly, contact pair 516a corresponds to when the deadbolt is sufficiently extended via counter clock-wise rotation of the thumb-turn or "left hand locked" (which may be used in a situation where the deadbolt lock is positioned on the right hand side of the door), and contact pair 516c corresponds to when the deadbolt is sufficiently extended via clock-wise rotation of the thumb-turn or "right hand locked" (which may be used in a situation where the deadbolt lock is positioned on the left hand side of the door). By employing both the left-hand and right-hand contacts, the system can automatically determine whether the lock is installed as a left-hand lock or a right-hand lock.

Contact pair 516b corresponds to when the bolt is in a retracted or unlocked position. When the conducting member connects the contact pairs, an electrical circuit is completed and in turn, a controller (not shown) powers the potentiometer 508 such that a position signal of the potentiometer can be sensed.

As can be appreciated in FIG. 4B, the output shaft is shown in phantom for clarity so that the wiper 510 can be seen contacting the conductive traces 516b. In one embodiment, the reference gear 512 rotates with a 1:1 gear ratio with output shaft 514 and drives the potentiometer via reference shaft 513 accordingly. Thus, the potentiometer signal corresponds directly to an angular position of the output shaft and linear position of the deadbolt.

As can be appreciated from the foregoing, two separate sensing arrangements are established. The position of the deadbolt is roughly known based on the connection of contact pairs, and is precisely known based on the reading of the potentiometer. By having two separate deadbolt sensing systems, the controller can consume less energy overall by only devoting power to the relatively energy intensive position reading process involving the potentiometer when the deadbolt is, as reported by the less energy intensive contacts based sensing system, within a position range that could require a more exact sensing modality. In one embodiment, no power is consumed (or consumed very little) by the potentiometer and/or the controller unless and until contact 510 electrically connects the contact pairs. In another embodiment, the contact pairs may themselves provide a gross indication of the position of the deadbolt via the position of the contact 510 on the a contact pair.

Figure 6:
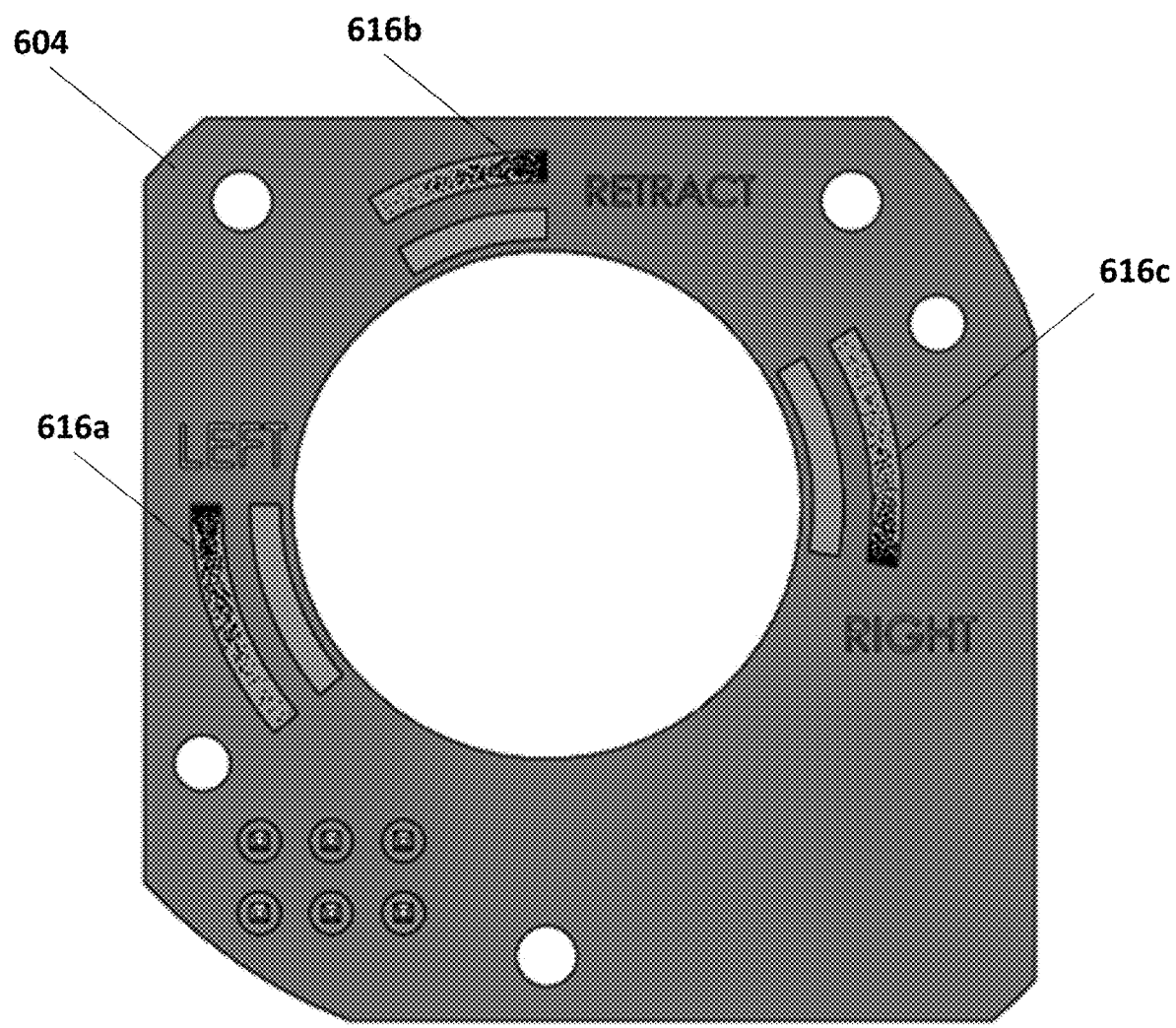
FIG. 6 is a bottom view of the sensor board of the deadbolt position sensing system according to another embodiment.

In one embodiment, as shown in FIG. 6, sensor board 604 is shown according to another embodiment of the deadbolt sensing system. In this embodiment, contact pairs 616a, 616b, and 616c each comprise a contact that leads to ground, and a resistive strip that changes resistivity based on position along the length of the arc. In one embodiment, the resistive strip increases in carbon density from end to end. As the carbon density increases, the resistance conferred by the strip increases. As a result, when the conductive member 510 connects the contact pair, the voltage or current in the circuit created by the connection would differ depending on where along the resistive strip the conducting member is contacting. Since each contact pair corresponds to an angular position range of the output shaft and a linear position range of the bolt, in this embodiment, the controller can determine where within the position range the deadbolt is located based on the voltage or current in the circuit formed by connecting the contacts. A second sensing system, like the reference gear and potentiometer of the previous embodiments, could also be used to supplement the contact pairs in this embodiment. It should be understood that any number of contact pairs could be employed based on the number of ranges of interest. In addition, while resistive strips that vary in carbon density are depicted and described, other contacts that change in the resistance could be used.

While pairs of contacts are described, just a single resistive strip, or groups of more than two contacts could be used as well.

Figure 7:
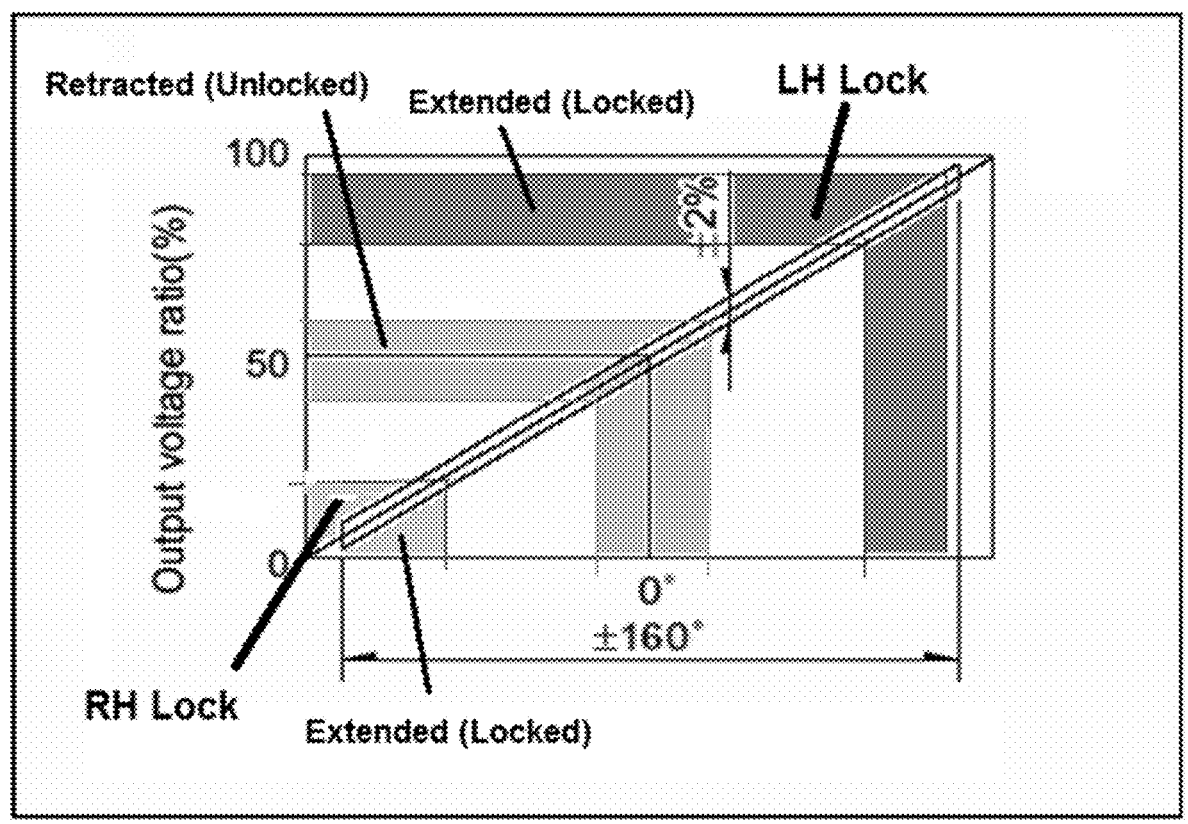
FIG. 7 is a graph showing an output voltage in a reference circuit as a function of an angle of a conducting member of the reference gear of the deadbolt position sensing system according to one embodiment.

FIG. 7 is a graph depicting the output voltage ratio of the potentiometer as a function of the angular position according to one embodiment. The voltage output indicates the exact deadbolt location taking into account all lost motion in the system. Once the sensor (potentiometer or other sensor) reaches the pre-determined voltage value, it indicates whether deadbolt is retracted (and the lock is unlocked), fully extended, also referred to in some situations as deadlocked (and the lock is locked), or un-determined state (non-deadlocking). As can be seen for a left hand (LH) lock, the output voltage varies from 50% (unlocked) to 100% (locked) over a range of +160 degrees of rotation of the output shaft. For a right hand (RH) lock, the output voltage varies from 50% (unlocked) to 0% (locked) over a range of −160 degrees of rotation of the output shaft. Without wishing to be bound by theory, an error of +/−2% is shown. As depicted, the LH Lock is considered locked if the output voltage is from about 80% to about 95% and at about +120 degrees to about +160 degrees of output shaft rotation whereas the RH Lock is considered locked if the output voltage is from about 5% to about 20% and at about −120 degrees to about −160 degrees of output shaft rotation. A non-deadlocked state is depicted as having an output voltage in the range of about 60% to 80% with a corresponding angular position of the output shaft of about +40 degrees to +120 degrees for a LH Lock and having an output voltage in the range of about 40% to 20% with a corresponding angular position of the output shaft of about −40 degrees to −120 degrees for a RH Lock.

While the depicted embodiment includes three pairs of arc shaped contacts, with two pairs used for a left hand installed lock and another two pair for a right hand installed lock, it should be understood that any number of contacts could be used depending on the number of position ranges of interest. Additionally, while pairs of contacts are shown, a single contact could be used with the conducting member serving as ground. Groups of more than two contacts could be used as well if required by the circuit reporting to the controller. Also, though embodiments described above use a reference gear connected to a potentiometer to serve as a detailed sensing system triggered by the contacts, it should be appreciated that instead of a potentiometer and reference gear, other arrangements for detecting rotation of the output shaft could be used including a reflective sensor, an interrupter sensor, an optical encoder, a conductive encoder, a magnetic encoder, or a Hall-effect sensor. In such situations, as discussed above, the relatively energy intensive precise sensor system would only become activated once the output shaft is within a desired range as detected by the contacts of the conductive strips with the contact on the output shaft.

The above-described embodiments of the technology described relating to the controller can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The term "software" is used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A deadbolt sensing system for sensing a position of a deadbolt, the sensing system comprising:
   a controller;
   an output shaft, wherein an angular position of the output shaft corresponds to a position of the deadbolt;
   a rotation sensor constructed and arranged to monitor the angular position of the output shaft and indicate the angular position to the controller;
   a conducting member operatively coupled to the output shaft and constructed and arranged to move with the output shaft; and at least one pair of conductive traces electrically connectable with the conducting member at a plurality of angular positions of the output shaft as the output shaft rotates, with the controller configured to determine a position of the deadbolt based at least on a first contacting position of the conducting member with the at least one pair of conductive traces.

2. The deadbolt sensing system of claim 1, wherein the output shaft includes a gear constructed and arranged to mesh with a reference gear, wherein an angular position of the reference gear corresponds to a position of the deadbolt.

3. The deadbolt sensing system of claim 1, further comprising a second pair of conductive traces electrically connectable with the conducting member at a plurality of angular positions of the output shaft as the output shaft rotates, with the controller configured to determine a position of the deadbolt based at least on a second contacting position of the conducting member with the second pair of conductive traces.

4. The deadbolt sensing system of claim 3, further comprising a third pair of conductive traces alternatively electrically connectable with the conducting member at a plurality of angular positions of the output shaft as the output shaft rotates, with the controller configured to determine a position of the deadbolt based at least on an alternative third contacting position of the conducting member with the third pair of conductive traces.

5. The deadbolt sensing system of claim 3, wherein each conductive trace is arc shaped and arranged in a circular configuration coaxial with the output shaft.

6. The deadbolt sensing system of claim 1, wherein the controller is configured to read the angular position of a reference gear coupled to a gear on the output shaft, when the conducting member contacts the at least one pair of the conductive traces.

7. The deadbolt sensing system of claim 1, wherein the controller is configured to provide power to the rotation sensor or to processing information from the rotation sensor only when the conducting member contacts the at least one pair of the conductive traces.

8. A deadbolt sensing system for sensing a position of a deadbolt, the sensing system comprising:
a controller;
an output shaft, wherein an angular position of the output shaft corresponds to a position of the deadbolt;
a conducting member operatively coupled to the output shaft and constructed and arranged to move with the output shaft; and
at least one pair of conductive traces electrically connectable with the conducting member at a plurality of angular positions of the output shaft as the output shaft rotates, with the controller configured to determine a position of the deadbolt based at least on a first contacting position of the conducting member with the at least one pair of conductive traces; wherein the at least one pair of the conductive traces is formed as a resistive strip that changes in resistance from one end of each strip to an opposite end of each strip.

9. The deadbolt sensing system of claim 8, wherein the controller is configured to detect at least one of a voltage or a current in a circuit formed upon contact of the conducting member with the resistive strip.

10. The deadbolt sensing system of claim 1, wherein the at least one pair of conductive traces is disposed on a sensor board.

11. The deadbolt sensing system of claim 1, wherein the rotation sensor is a potentiometer constructed and arranged to be driven by a shaft extending from the reference gear.

12. A deadbolt sensing system for sensing a position of a deadbolt, the sensing system comprising:
a rotation sensor;
a controller;
an output shaft, wherein an angular position of the output shaft corresponds to a position of the deadbolt, and the rotation sensor monitors the angular position of the output shaft;
a conducting member operatively coupled to the output shaft and constructed and arranged to move with the output shaft; and
at least one pair of conductive traces electrically connectable with the conducting member at a first plurality of angular positions of the output shaft as the output shaft rotates, and the connecting of the at least one pair of conductive traces and conducting member triggers the controller to read the angular position of the output shaft from the rotation sensor;
wherein the output shaft includes a gear constructed and arranged to mesh with a reference gear, wherein an angular position of the reference gear corresponds to a position of the deadbolt; and
wherein the rotation sensor is a potentiometer constructed and arranged to be driven by a shaft extending from the reference gear.

13. The deadbolt sensing system of claim 12, further comprising a second pair of conductive traces, wherein the conducting member is constructed and arranged to from an electrical connection with the second pair of conductive traces at a second plurality of angular positions of the output shaft as the output shaft rotates, wherein the connecting of the second pair of conductive traces and the conducting member triggers the controller to read the angular position of the reference gear from the rotation sensor.

14. The deadbolt sensing system of claim 13, further comprising a third pair of conductive traces, wherein the conducting member is constructed and arranged to alternatively form an electrical connection with the third pair of conductive traces at a third plurality of angular positions of the output shaft as the output shaft rotates, wherein the connecting of the third pair of conductive traces and the conducting member triggers the controller to read the angular position of the reference gear from the rotation sensor.

15. The deadbolt sensing system of claim 12, further comprising a thumb drive constructed and arranged to be rotated upon manual actuation, wherein a ratio of rotation of the thumb drive to movement of the deadbolt is a 1:1 drive ratio, and wherein a ratio of rotation of the thumb drive to a rotation of the reference gear is a 1:1 gear ratio.

16. A deadbolt sensing system for sensing a position of a deadbolt, the sensing system comprising:
a rotation sensor;
a controller;
an output shaft, wherein an angular position of the output shaft corresponds to a position of the deadbolt, and the rotation sensor monitors the angular position of the output shaft;
a conducting member operatively coupled to the output shaft and constructed and arranged to move with the output shaft; and
at least one pair of conductive traces electrically connectable with the conducting member at a first plurality of angular positions of the output shaft as the output shaft rotates, and the connecting of the at least one pair of conductive traces and conducting member triggers the controller to read the angular position of the output shaft from the rotation sensor; wherein the controller is configured to provide power to the rotation sensor or to processing information from the rotation sensor only when the conducting member contacts the at least one pair of the conductive traces.

17. A deadbolt sensing system for sensing a position of a deadbolt, the sensing system comprising:

a rotation sensor;

a controller;

an output shaft, wherein an angular position of the output shaft corresponds to a position of the deadbolt, and the rotation sensor monitors the angular position of the output shaft;

a conducting member operatively coupled to the output shaft and constructed and arranged to move with the output shaft; and at least one pair of conductive traces electrically connectable with the conducting member at a first plurality of angular positions of the output shaft as the output shaft rotates, and the connecting of the at least one pair of conductive traces and conducting member triggers the controller to read the angular position of the output shaft from the rotation sensor; wherein the at least one pair of the conductive traces is formed as a resistive strip that changes in resistance from one end of each strip to an opposite end of each strip.

18. The deadbolt sensing system of claim 17, wherein the controller is configured to detect at least one of a voltage or a current in a circuit formed upon contact of the conducting member with the resistive strip.

19. The deadbolt sensing system of claim 12, in combination with a lock, the lock including the deadbolt.

\* \* \* \* \*